United States Patent [19]

Levy et al.

[11] 4,370,749

[45] Jan. 25, 1983

[54] PHASE NOISE CORRECTION CIRCUIT FOR A DATA TRANSMISSION SYSTEM

[75] Inventors: Michel Levy, Massy; Christian Poinas, Boulogne, both of France

[73] Assignee: Compagnie Industrielle des Telecommunications Cit-Alcatel, Paris, France

[21] Appl. No.: 198,086

[22] Filed: Oct. 17, 1980

[30] Foreign Application Priority Data

Oct. 19, 1979 [FR] France ............................ 79 26065

[51] Int. Cl.$^3$ .......................................... H04B 15/00
[52] U.S. Cl. ...................................... 375/99; 375/57; 375/119; 328/155; 328/162
[58] Field of Search ..................... 375/34, 51, 57, 60, 375/96, 99, 101, 119, 81, 11–15; 455/303–306; 328/155, 162, 165–167; 364/724, 824; 375/11–15; 333/17, 17 R, 18

[56] References Cited

U.S. PATENT DOCUMENTS

| | | | |
|---|---|---|---|
| 3,305,798 | 2/1967 | Rappeport | 333/18 |
| 3,868,603 | 2/1975 | Guidoux | 333/18 |
| 3,971,996 | 7/1976 | Motley | 328/155 |
| 3,974,449 | 8/1976 | Falconer | 333/18 |

FOREIGN PATENT DOCUMENTS

| | | |
|---|---|---|
| 2283606 | 3/1976 | France . |
| 2296315 | 7/1976 | France . |
| 2354003 | 12/1977 | France . |
| 2408949 | 6/1979 | France . |

OTHER PUBLICATIONS

Jackson, Kaiser, McDonald, "An Approach to Implemention of Digital Filter", Sep. 1968, IEEE Transaction on Audio and Electroacoutics, pp. 413–421.

Shoichi Hosokawa, Kazumi Yamashita, "Second Order Recursive Digital Filter Using Delta Modulation", Dec. 1975 Memoirs of Faculty of Eng. Osaka City University.

R. B. Crow, "Third–Order Phase Locked Loop Receiver", Aug. 3, 1974, NASA Tech Brief, NASA Pasadena Office.

S. C. Gupta and Solem "Optimum Filter for Second and Third Order Phase Lock Loop by an Error Function Criterion", Jun. 1965 IEEE Transactions on Space Electronics and Telemetry, vol. 2, pp. 54–62.

M. Y. Levy "Adaptative Phase Correctors for Data Transmission Receivers", Jun. 10–14, 1979 International Conference on Communications, vol. 3 or 4, pp. 45.51–45.55.

M. Levy "Auto Adaptive Phase Jitter and Intersymbol Interference Suppression for Data Transmission Receivers", National Telecommunication Conference, vol. II 29, Nov. 30, 1976 and Dec. 1, 1976, pp. 45.21–45.2–3.

Primary Examiner—Benedict V. Safourek
Assistant Examiner—Stephen Chin
Attorney, Agent, or Firm—Sughrue, Mion, Zinn, Macpeak & Seas

[57] ABSTRACT

A phase noise correction circuit for a synchronous data transmission system using symbols and including a decision circuit (33) at its receiving end for supplying an estimate of the transmitted symbols on the basis of the received symbols, wherein said correction circuit comprises a phase shifter circuit (36) located at the receiving end ahead of the decision circuit (33) and provided with a third-order phase-controlling feedback circuit (37) comprising:

- a phase shift angle generator (62) having an incrementation input and providing the phase shifter circuit (36) with the value of a phase shift angle updated at the rate at which the symbols are received,
- a phase error detector (60) providing the value of the phase error between the received and the estimated symbols appearing at the terminals of the decision symbols, likewise at the rate at which the symbols are received; and
- a filter (61) interposed between the output of the phase error detector (60) and the incrementation input of the phase shift angle generator (62), the said filter (61) having a transfer function expressed as follows using the z transform:

$$M(z) = a + \frac{b + cz^{-1}}{1 - z^{-1}} + \frac{dz^{-1}}{(1 - z^{-1})^2}$$

where a, b, c and d are positive non-zero coefficients. This circuit is particularly intended for use with quadrature amplitude modulation.

5 Claims, 5 Drawing Figures

PHASE NOISE CORRECTION CIRCUIT FOR A DATA TRANSMISSION SYSTEM

The present invention relates to synchronous data transmission via a transmission channel of limited bandwidth, and concerns reducing the kind of distortion which leads to reception errors in the estimation of the transmitted symbols, and consequently which limits the binary data rate

BACKGROUND OF THE INVENTION

It has been shown by H. Nyquist that the speed of transmission over an ideal low-pass network cannot exceed two data pulses per hertz of passband, and that this theoretical limit could be approached by a transmission channel whose overall behaviour for data pulses is like that of a low-pass filter of linear phase characteristic and gradual cutoff. Thus, when it is desired to transmit data at a high binary rate, it becomes necessary firstly to reduce the transmission speed for transmission purposes by replacing the binary data with multivalent symbols, and secondly to bring the characteristics of the link used for the transmission as close as possible to those of a low-pass filter with a linear phase characteristic and gradual cutoff, by means of a shaping filter, optionally by means of modulation, and by correcting the distortion applied to the useful band by the link as set up for the transmission.

In practice, binary data streams for transmission are transformed either into a string of real multivalent symbols at a lower rate for transmission over a single channel, or else into a string of pairs of real multivalent symbols at a lower rate for simultaneous transmission over two inpendent channels in quadrature. The first case is encountered particularly in baseband transmission systems, or in systems using single or residual sideband amplitude modulation, while the second case is encountered in data transmissions using amplitude modulation of two carriers in quadrature, or in similar systems such as transmission by phase jumps between four or eight states or using combined phase and amplitude modulation. Where two channels in quadrature are used, it is possible to reduce the second case to the first by considering the two components of a pair of symbols as the real part and the imaginary part of a complex symbol, and by substituting complex quantities for the real quantities used in calculations performed by the first case. Conversely, a study of the first case can be assimilated to one of the second by associating a quadrature channel to the single channel. A signal derived from that transmitted over the single channel is applied to the quadrature channel, this signal is usually the Hilbert transform of the single channel signal. For these reasons, it is customary to represent a data transmission signal in complex form.

The distortion suffered in the useful band comprises both distortion of slowly varying characteristics of the transmission channel, in the form of amplitude distortion and of group propagation delay distortion, and also distortion of somewhat more rapidly varying characteristics in the form of phase noise distortion. Distortion correction is performed on the multivalent symbols. When modulation is present, it may also be performed on the received signal in its passband before demodulation.

Amplitude distortion and group propagation delay distortion in the transmission channel are corrected by means of a filter which, in the useful band, has transmission characteristics that are the inverse of those of the transmission channel, whereby the overall response in said band is flat in amplitude and linear in phase. For this purpose, it is standard practice to use linear self-adaptive equalizers based on K. E. Kalmann's time domaine transversal filter using coefficients that are controlled to minimize the error between received symbols and their exact values or their estimated values. Such equalizers are automatically matched to the characteristics of the transmission channel during a setting up period when the data stream is replaced by a test sequence known at the receiving end, and thereafter they continue to adapt to the slowly varying characteristics of the transmission channel during data transmission.

One self-adaptive linear equalizer of the above-mentioned type and used in conjunction with a single channel, after demodulation where appropriate, comprises a time domain transversal filter having a delay line with intermediate taps separated by the unit of time which separates two successive symbols at transmission, and whose coefficients are constantly being adjusted by feedback control loops which tend to minimize the mean square error using a gradient algorithm defined by a linear equation of first order differences between real magnitudes.

The abovementioned self-adaptive linear equalizer is suitable for a single channel but there exists a complex version suitable for two channels in quadrature. The complex version can be deduced from the simple version by the "complex/real" correspondence mentioned above, and may be considered as comprising four time domain transversal filters arranged in a trellis configuration, pairs of said filters having the same sets of coefficients, and their outputs being connected in pairs, one pair via a subtractor and the other via an adder. The feedback control loops tending to minimize the mean square error use a gradient algorithm defined by the same linear equation of first order differences, but this time between complex magnitudes.

The relative importance of phase noise increases with transmission rate. In particular, phase noise on the telephone network is not a hindrance for conversations where data is transmitted at a low rate (1,200 bits/s), but it becomes more troublesome for transmission of data at higher rates (4,800 bits/s and above). Phase noise may have various components:
- a drift in frequency, for example due to modulation followed by demodulation using carriers that are not synchronized;
- a constant phase shift;
- a periodic phase shift varying at mains frequency or one of its harmonics, such as is encountered particularly when using cables with carrier waves; and
- a random phase shift occuring at low frequency with respect to the bandwidth of the channel.

Phase noise can be considered as being derived from variations in the characteristics of the transmission channel. However, except for its DC and very low frequency components, phase noise cannot be eliminated by the linear self-adaptive equalizers used to correct amplitude distortion and group propagation delay distortion of the transmission channel since such filters converge too slowly. Indeed, said correction requires a self-adaptive equalizer to have a long impulse response with respect to that of the transmission channel which, taking the speed of transmission into account, requires many coefficients. Now, for stability reasons, the higher the number of coefficients the slower a linear self-adaptive equalizer converges, and to a first approximation the speed of convergence is inversely proportional to the number of coefficients. For this reason, the elimination of phase noise and more generally of any distortion due to rapid variations in the transmission channel is performed by additional correction circuits.

For example, it is known to provide a complex phase shifter after a complex self-adaptive linear equalizer at the receiver end of a digital data transmission using amplitude modulation of two carriers in quadrature. The complex phase shifter is provided with a first order phase-locking loop controlled by the data, however, in the presence of harmonics it is not sufficiently accurate to follow the kind of frequency drift encountered in practice. This has lead to a proposal that a second order phase locking loop should be used controlled by the data, however, this has turned out to be too slow to eliminate phase jitter. This has therefore lead to the use of two successive complex phase-shifters, one having a first order phase-locking loop to eliminate phase jitter, and the other having a second order phase-locking loop to eliminate frequency drift. This results in functions being performed twice over:

the phase error is estimated twice;

two complex exponentials corresponding to two correction angles are generated; and two complex multiplications are performed to obtain two phase corrections. There is thus considerable complication in the implementation of a phase noise correction circuit.

The aim of the present invention is to avoid such complication, without thereby reducing the efficiency of phase noise correction.

SUMMARY OF THE INVENTION

The present invention provides a phase noise correction circuit for a synchronous data transmission system using symbols and including a decision circuit at its receiving end for supplying an estimate of the transmitted symbols on the basis of the received symbols, wherein said correction circuit comprises a phase shifter circuit located at the receiver end ahead of the decision circuit and provided with a third-order phase-controlling feedback circuit.

In a preferred variant, the phase-controlling feedback circuit comprises:

a phase shift angle generator having an incrementation input and providing the phase shifter circuit with the value of a phase shift angle updated at the rate at which the symbols are received;

a phase error detector providing the value of the phase error between the received and the estimated symbols appearing at the terminals of the decision circuit, likewise at the rate at which the symbols are received; and a filter interposed between the output of the phase error detector and the incrementation input of the phase shift angle generator, the said filter having a transfer function expressed as follows using the z transform:

$$M(z) = a + \frac{b + cz^{-1}}{1 - z^{-1}} + \frac{dz^{-1}}{(1 - z^{-1})^2}$$

where a is a constant approximately equal to 0.92 b is a constant approximately equal to 0.0004 c is a constant approximately equal to 0.0176, and d is a constant approximately equal to 0.00036.

In a simplified version of the abovementioned variant, the filter has a modified transfer function which is expressed as follows using the z transform:

$$M'(z) = a + \frac{b + c}{1 - z^{-1}} + \frac{d}{(1 - z^{-1})^2}$$

BRIEF DESCRIPTION OF THE DRAWINGS

Embodiments of the invention are described by way of example with reference to the accompanying drawings in which:

FIGS. 6 and 7 show modified versions of the phase noise inversion circuits of FIGS. 3 and 4, respectively.

DETAILED DESCRIPTION

An embodiment of the invention is described below in the context of a synchronous data transmission system using amplitude modulation of two carriers in quadrature (QAM).

Figure 1:
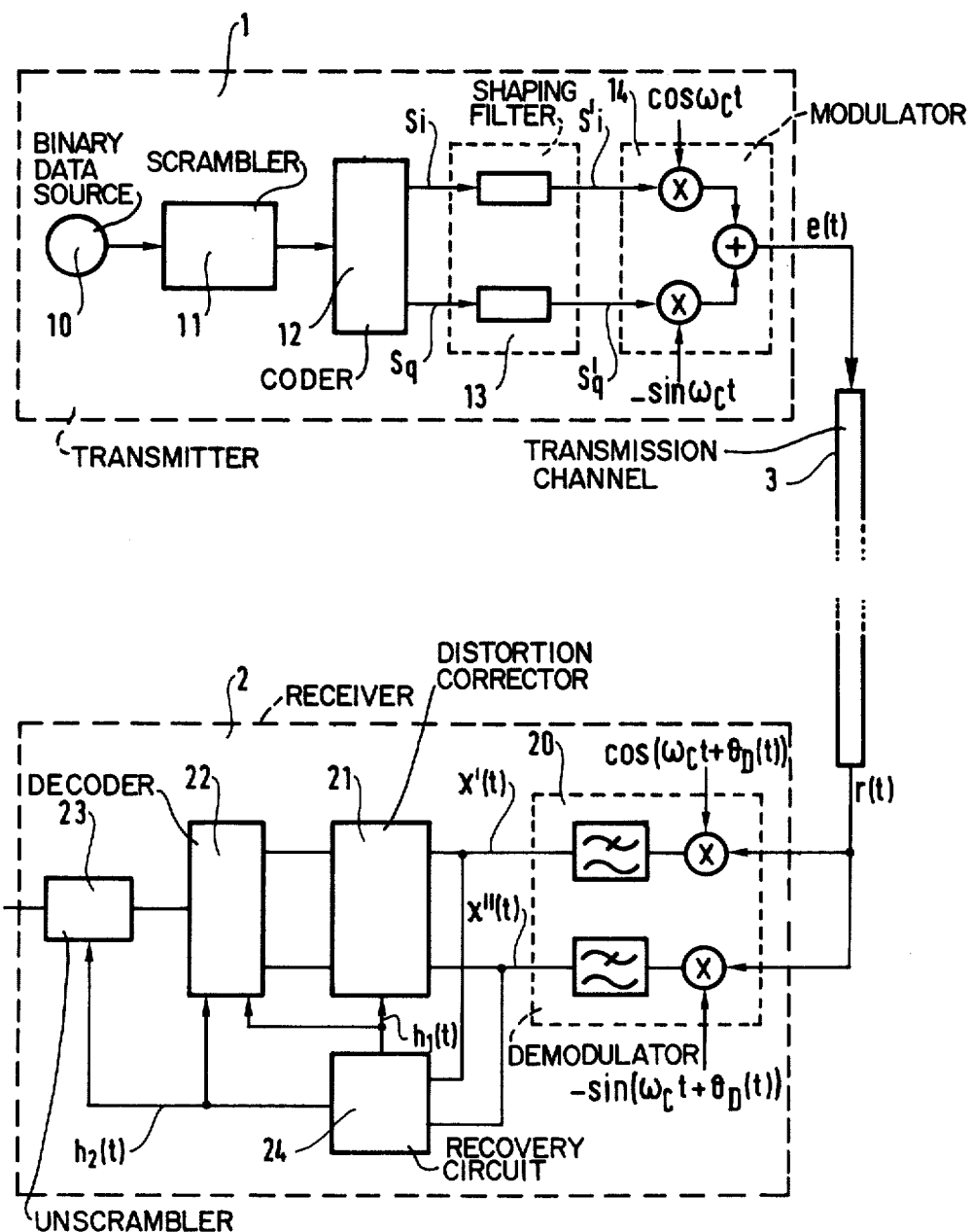
FIG. 1 is a block diagram of a synchronous data transmission system using amplitude modulation of two carriers in quadrature.

The purpose of FIG. 1 is to place the invention in such a system. FIG. 1 is a block diagram of a synchronous data transmission system using QAM.

In FIG. 1 a transmitter portion 1 is connected to a receiver portion 2 by a transmission channel 3.

The transmitter portion comprises a source of binary data 10 followed by a scrambler 11, a coder 12, a shaping filter 13 and a modulator 14.

The source 10 delivers the binary data to be transmitted.

The scrambler 11 performs modulo-2 addition of the binary data from the source 10 and a pseudo-random binary sequence generated at the same rate. As is well known, the scrambler serves to make the amplitudes of the spectral lines of the binary data in the frequency domain more uniform, thereby facilitating, inter alia, clock-rate recovery at the receiver.

The coder 12 transforms the binary data into complex symbols appearing at a lower rate. For example, when using 16 QAM a single complex symbol may have four different amplitude levels and four different phase angles, corresponding to a four-bit binary word which makes it possible to obtain a symbol rate or a speed of modulation that is four times less the binary rate. The coder 12 has two outputs at which the in-phase component $S_i$ and the quadrature component $S_q$ of the symbols appear in parallel.

The shaping filter 13 is constituted by two identical filters operating on respective symbol components and limiting their frequency spectrum in conformity with the criteria established by H. Nyquist. For example, these filters may have a raised cosine characteristic.

The modulator 14 is a modulator having two carriers in quadrature. It receives the two filtered components $S'_i$ and $S'_q$ and two versions in quadrature of a transmission carrier $\omega_c$. It delivers an output signal e(t) constituted by the sum of the products of the components of the symbols multiplied by respective versions of the transmission carrier.

A bandpass filter (not shown) is often inserted between the modulator 14 and the transmission channel 3 in order to limit the band of the transmitted signal to that of the transmission channel 3.

The receiver portion 2 comprises a demodulator 20 followed by a distortion corrector device 21, a decoder 22 and an unscrambler 23. It also comprises a clock recovery circuit 24 having inputs connected to the outputs of the demodulator 20 and having outputs connected to the distortion correction device 21, to the decoder 22 and to the unscrambler 23.

The demodulator 20, which is often preceded by a filter limiting the band of the input signal to the receiver portion, is a demodulator having two carriers in quadrature. It receives firstly the signal r(t) from the transmission channel and secondly two versions in quadrature of a reception carrier at the same angular frequency $\omega_c$ as the transmission carrier. The reception carrier is not synchronized with the transmission carrier and therefore has a time variable phase difference $\theta_D$ therefrom. The demodulator 20 has two outputs on which it applies two demodulated signals respectively. One of the demodulated signals x'(t) is said to be the in-phase signal and the other x"(t) is said to be the quadrature signal.

The clock recovery circuit 24 recovers the rate $h_1(t)$ at which the symbols are transmitted i.e. the speed of modulation, which serves as the clock signal for the distortion correction device 21. It also generates the binary data rate $h_2(t)$ by multiplication. In the example considered, where the transmitter shaping filter 13 has a raised cosine characteristic, the clock recovery circuit operates on the basis of a spectral line present in the demodulated signal and at the half-frequency of the speed of modulation.

The distortion correction device 21 which is described in greater detail below, serves to remove distortion from the demodulated signals x'(t) and x"(t). It removes both linear amplitude distortion and linear group propagation delay distortion as introduced by the transmission channel, i.e. interference between symbols, and also phase noise, in particular frequency drift and the phase difference due to the fact that the transmitter and receiver carriers are not synchronized to each other.

The decoder 22 translates into binary the symbols which are applied thereto by the distortion correction device 21. For this purpose, it receives two clock signals, one at the symbol transmission rate and the other at the binary data transmission rate.

The unscrambler 23 serves at the receiver end to recover the binary data delivered by the data source 10 at the transmitter end.

Except for the distortion correction device, the various circuits listed above will not be described in detail since they do not form part of the present invention while they have been described in numerous articles. In this respect, a good reference book is "Principles of data communication" by R. W. Lucky, J. Salz and E. J. Weldon published by McGraw-Hill 1968.

Figure 2:
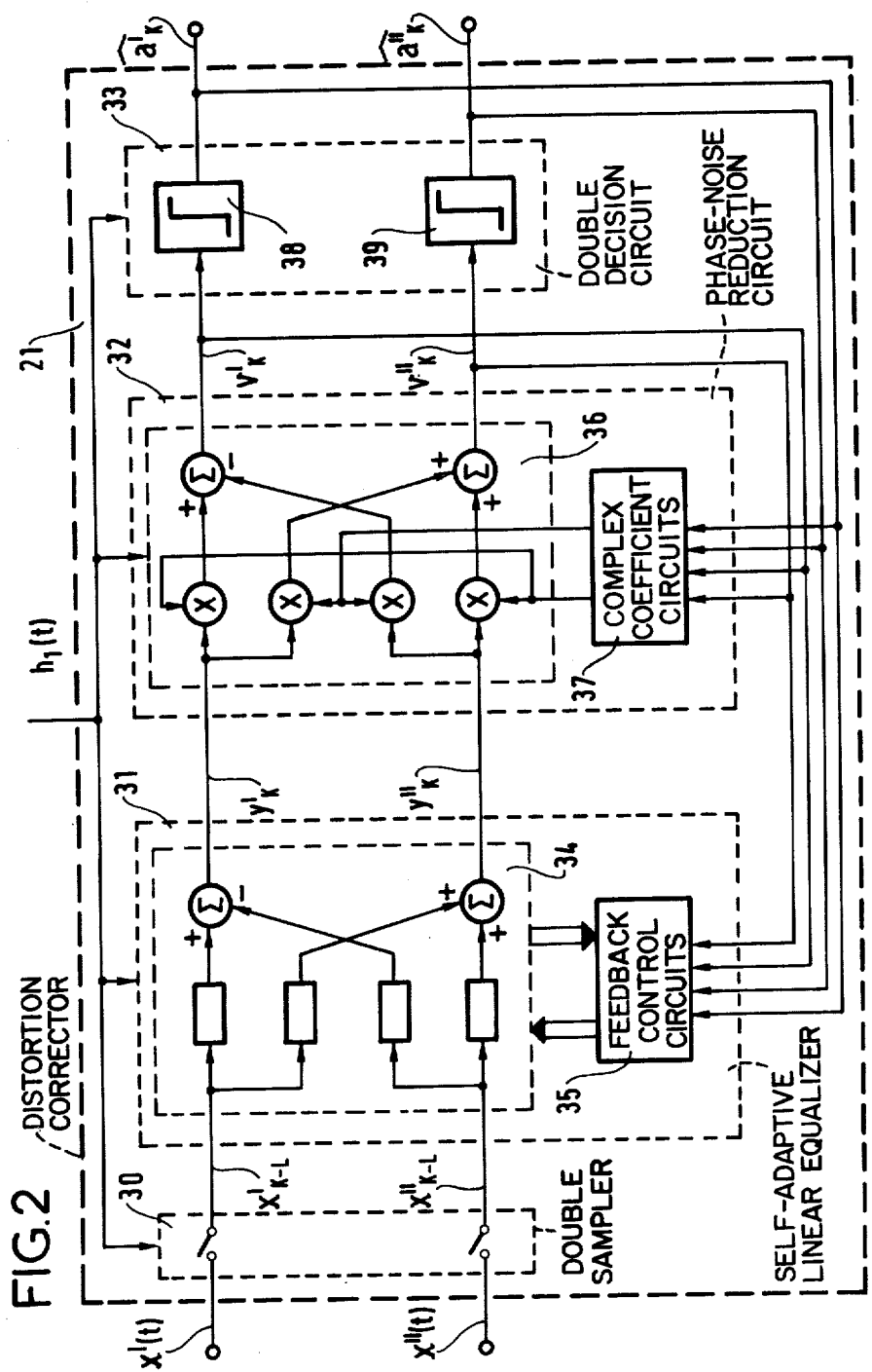
FIG. 2 shows a distortion correction circuit of FIG. 1 in greater detail.

The distortion correction device 21 of FIG. 1 is shown in greater detail in FIG. 2. At its input end it has a pair of samplers 30 and at its output end it has a pair of decision circuits 33. In between the input pair of samplers 30 and the output pair of decision circuits 33, there is a long complex self-adaptive linear equalizer 31 followed by a phase noise correction circuit 32.

The pair of sampling circuits 30 receives the demodulated signals x'(t) and x"(t) on independent channels from the synchronous demodulator (20 see FIG. 1) and at its output it delivers pairs of samples $x'_{k-l}$ and $x"_{k-l}$ at the rate of $1/\Delta T$ equal to the modulation speed $h_1(t)$ supplied by the clock recovery circuit (24 see FIG. 1).

The long self-adaptive complex linear equalizer 31 corrects linear amplitude distortion and linear group propagation delay distortion introduced by the transmission channel and at its output it delivers pairs of samples $y'_k$ and $y"_k$ of an equalized signal, i.e. without intersymbol interference.

The phase noise correction circuit 32 acts on the phase of the complex signal which it receives from the long self-adaptive complex linear equalizer 31, by multiplying the complex signal by a complex coefficient of unit modulus, namely: $\exp(i\hat{\theta}_k)$, where $\hat{\theta}_k$ is the applied correction angle. The phase noise correction circuit 32 delivers pairs of output samples $v'_k$ and $v"_k$ which may be written:

$$v_k = v'_k + iv"_k = y_k \exp(i\hat{\theta}_k)$$

The pair of decision circuits 33 comprises two threshold circuits 38 and 39 which supply the estimated components $\hat{a}'_k$ and $\hat{a}"_k$ of the complex transmitted symbol in response to the components $v'_k$ and $v"_k$ of the received complex symbol after processing by the distortion correction circuits. Throughout the remainder of this description, the estimated components $\hat{a}'_k$ and $\hat{a}"_k$ can be replaced by the components $a'_k$ and $a"_k$ of the transmitted symbol whenever these are known to the receiver, as is in fact the case during the setting up period which precedes the effective transmission of data.

The long self-adaptive complex linear equalizer 31 is shown in FIG. 2 as a block 34 containing the four elementary equalizers that constitute the complex equalizer, together with a block 35 having the feedback control circuits which continuously adapt the coefficients of the elementary equalizers. The structure and the connections of the block 35 is determined by the usual techniques depending on the algorithm used for adapting the coefficients. The coefficients are adapted in such a manner as to minimize an error signal defined by the differences between the received symbols $v_k$ as applied to the inputs of the pair of decision circuits 33 and the estimated symbols $\hat{a}_k$ as supplied at the outputs therefrom. The algorithm may be a gradient algorithm. For further details concerning the equalizer, reference may be made to existing publications, in particular an article by C. Macchi, J. P. Jouannaud and O. Macchi entitled "Récepteurs adaptatifs pour transmissions de données" (Adaptive receivers for data transmission) which appeared in the journal "Annales des télécommunications" 30 no 9–10, 1975 pp. 311–330.

The phase noise correction circuit 32 is a phase shifter constituted by a complex multiplier 36 and a feedback control circuit 37. The complex multiplier 36 multiplies the components $y'_k$ and $y''_k$ of the complex symbols delivered by the long self-adaptive complex linear equalizer 31 by the components $\cos \hat{\theta}_k$ and $\sin \hat{\theta}_k$ of the complex phase correction coefficient $\exp(i\hat{\theta}_k)$. The feedback control circuit 37 derives the phase correction coefficient from the components $v'_k$ and $v''_k$ of the complex symbols applied to the inputs of the pair of decision circuits 33 and the components $\hat{a}'_k$ and $\hat{a}''_k$ of the estimated output signals delivered by the said pair of decision circuits 33.

Figure 3:
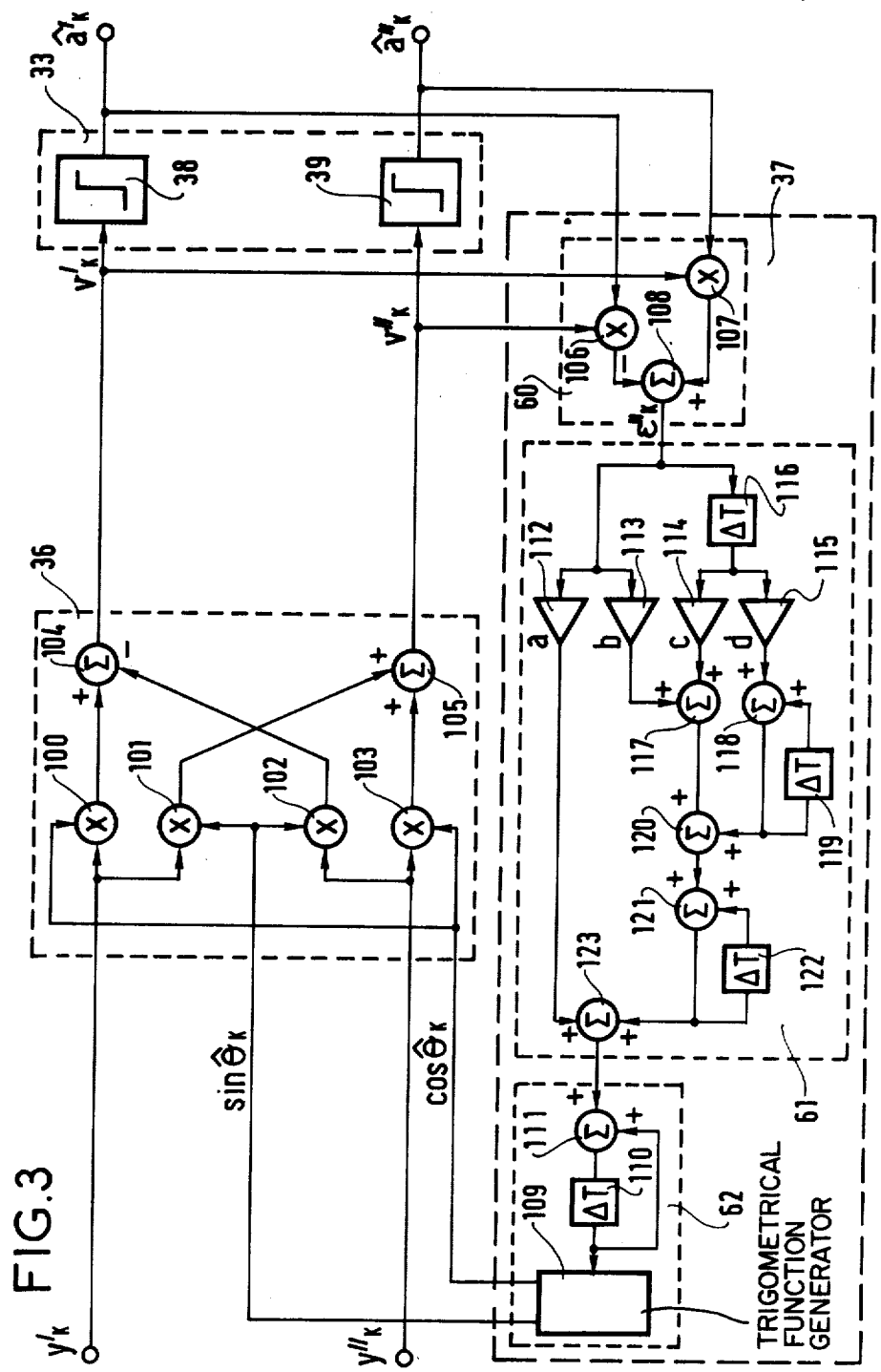
FIG. 3 shows a phase noise correction circuit for use in the distortion correction circuit of FIG. 2 and embodying the invention.

FIG. 3 shows one embodiment of the phase correction circuit 32 in greater detail, together with its interconnections to the pair of decision circuits 33.

The complex multiplier 36 comprises four elementary multipliers 100, 101, 102, and 103 and two summing circuits 104 and 105 each having two inputs. The summing circuit 104 has one of its inputs connected for subtraction. The complex multiplier 36 has a first input which receives the complex signal $y'_k + iy''_k$ from the long self-adaptive complex linear equalizer 31 (FIG. 2) and a second input which receives the complex phase correction coefficient $\cos \hat{\theta}_k + i \sin \hat{\theta}_k$, and at its output it delivers a complex signal $v'_k + iv''_k$ where:

$$v'_k + iv''_k = (y'_k + iy''_k)(\cos \hat{\theta}_k + i \sin \hat{\theta}_k)$$

which may be written in complex form:

$$v_k = y_k \exp(i\hat{\theta}_k)$$

The feedback control circuit 37 comprises a phase error detector 60 whose inputs are connected to the inputs and to the outputs of the pair of decision circuits 33, a digital filter 61 connected to the output of the phase error detector 60, and a phase shift angle generator 62 controlled by the output signal from the digital filter 61.

The phase error detector 60 delivers a signal $\epsilon''_k$ representative of the difference in phase that exists between the complex symbol $v_k$ as applied to the inputs of the decision circuit pair 33 and the value of the symbol $a_k$ estimated by the same circuit pair:

$$v_k = \hat{a}_k \exp(-i\epsilon''_k) \quad (5)$$

It operates in known manner by means of the quantity:

$$v'_j \hat{a}''_j - v''_j \hat{a}'_j \quad (6)$$

Let $\theta_j$ be the phase error of a complex symbol $y_j$ delivered by the long complex linear equalizer 31.

$$y_j = \hat{a}_j \exp(-i\theta_j) \text{ and } \epsilon''_j = \theta_j - \hat{\theta}_j \quad (7)$$

whence $$\sin(\hat{\theta}_j - \theta_j) = Im[\exp(i\hat{\theta}_j) \times \exp(-\theta_j)]$$

and taking into account the first equation at (7):

$$\sin(\hat{\theta}_j - \theta_j) = Im\left[\frac{y_j}{\hat{a}_j} \exp(i\hat{\theta}_j)\right]$$

taking into account the definition of the signal $v_j$:

$$v_j = y_j \exp(i\hat{\theta}_j)$$

which gives:

$$\sin(\hat{\theta}_j - \theta_j) = Im\left(\frac{v_j}{\hat{a}_j}\right) = \frac{1}{|\hat{a}_j|^2} Im(v_j \hat{a}_j^*)$$

Whence taking into account the second equation at (7):

$$\sin \epsilon''_j = \frac{1}{|\hat{a}_j|^2} Im(v_j^* \hat{a}_j)$$

which shows that the sine of the phase error $\epsilon''_j$ is a function of the quantity (6).

When the phase feedback control is operating correctly, the residual phase error $\epsilon''_k$ is small and may be considered equal to its sine. Further, the terms in $1/|\hat{a}_j|^2$ vary much more rapidly than the terms in $im(v_j^* \hat{a}_j)$. Given the use of scrambling of the transmitter, and over a short interval of time in relation to the rate at which the terms in $Im(v_j^* a_j)$ vary, the terms in $1/|\hat{a}_j|^2$ have a constant average value such that they may be replaced by their average value which can then be used as a mere coefficient.

The phase error detector 60 comprises two multipliers 106 and 107 whose outputs are connected by a summing circuit 108. The multiplier 106 has two inputs, one connected to the output of the threshold circuit 38 of the decision circuit pair 33 whence the component $\hat{a}'_k$ of the estimated symbols is available, and the other is connected to the output of the summing circuit 105 whence the signal $v''_k$ is obtainable. The multiplier 107 has two inputs, one connected to the output of the threshold circuit 39 of the decision circuit pair 33 whence the component $\hat{a}''_k$ of the estimated symbols is obtainable, and the other connected to the output of the summing circuit 104 whence the signal $v'_k$ is obtainable. The multiplier 106 is connected to a subtraction input to the summing circuit 108 while the multiplier 107 is connected to an addition input of the same summing circuit whereby the output of the summing circuit provides the signal:

$$\epsilon''_k = v'_k \hat{a}''_k - v''_k \hat{a}'_k = Im(v_k^* \hat{a}_k)$$

The phase shift angle generator 62 comprises a trigometrical function generator 109 controlled by a digital integration loop for updating. The digital integration loop comprises, in conventional manner, a two-input summing circuit 111 and a delay circuit 110 disposed between the output and out input of the summing circuit, to provide a delay $\Delta T$ to the signal passing therethrough. It updates the phase correction angle $\hat{\theta}_k$ by performing an algorithm of the form:

$$\hat{\theta}_{k+1} = \hat{\theta}_k + m(\epsilon''_j) i\epsilon[-\infty, k]$$

which in terms of the z transform may be written:

$$\hat{\theta}(z) = \frac{z^{-1}}{1 - z^{-1}} M(z)\epsilon''(z)$$

The value by which the phase correction angle is modified $m(\epsilon_j'')$ is supplied by the digital filter 61 which, using the notation of the above equation, has a transfer function M(z). This transfer function is a second order function in order to obtain, in combination with the digital integration loop 110, 111 of the phase shift angle generator 62 and in accordance with the invention an overall transfer function for the phase controlling feedback loop that is of third order. The transfer function expressed in terms of its z transform has the form:

$$M(z) = a + \frac{b + cz^{-1}}{1 - z^{-1}} + \frac{dz^{-1}}{(1 - z^{-1})^2} \tag{8}$$

This ensures that the performance of the phase noise correction circuit 32 is analogous to the performance of a circuit comprising two successive feedback loops for controlling phase, one of the loops being a first order loop for correcting phase jitter and the other being a second order loop for correcting frequency drift, however, the present circuit is less complicated.

A first order phase controlling feedback loop for correcting phase jitter may be represented in the form of a summing circuit having an adding input to which the measured value of the phase angle to be corrected is applied and a subtracting input connected to the output of the summing circuit via a filter having a transfer function which, in terms of the z transform may be expressed as follows:

$$G(z) = \frac{\delta_1 z^{-1}}{1 - z^{-1}} \text{ where } \delta_1 > 0 \tag{9}$$

This is true since in such a loop the phase correction angle is determined by an algorithm of the form:

$$\theta_{k+1} = \hat{\theta}_k + \delta_1 \epsilon''_{2,k} \text{ where } \delta_1 > 0$$

which, using the z transform can be written $$\hat{\theta}(z) = \frac{\delta_1 z^{-1}}{1 - z^{-1}} \epsilon''_2(z)$$

Likewise, a second order phase controlling feedback loop for controlling frequency drift can be represented in the form of a summing circuit having an adding input to which the measured value of the phase angle to be corrected is applied and a subtracting input connected to the input of the summing circuit via a filter having a transfer function which, in terms of its z transform has the form:

$$F(z) = \frac{z^{-1}}{1 - z^{-1}} \left( \gamma_1 + \frac{\gamma_2}{1 - z^{-1}} \right) \text{ where } \gamma_1 > 0 \text{ and } \gamma_2 > 0 \tag{10}$$

This is true since in such a loop the phase correction angle is determined by an algorithm having the form:

$$\hat{\theta}_{k+1} = \hat{\theta}_k + \gamma_1 \epsilon''_{1,k} + \gamma_2 \sum_{-\infty}^{k} \epsilon''_1 i$$

which using the z transform can be written:

$$\hat{\theta}(z) =$$

$$\frac{z^{-1}}{1 - z^{-1}} \left( \gamma_1 + \frac{\gamma_2}{1 - z^{-1}} \right) \epsilon''(z) \text{ where } \gamma_1 > 0 \text{ and } \gamma_2 > 0$$

Figure 5:
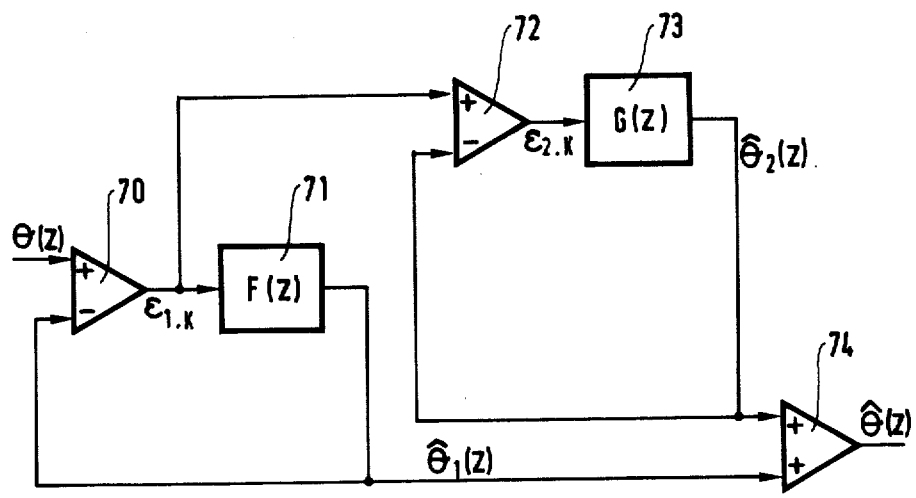
FIG. 5 is the equivalent circuit of a phase noise correction circuit having two feedback control loops in cascade, the first being a first order control loop and the second being a second order control loop.

From which it follows that a phase noise correction circuit comprising two successive phase controlling feedback loops, one being a first order loop for correcting phase jitter and the other a second order loop for correcting frequency drift may be represented as shown in FIG. 5 by:

a first summing circuit 70 having an adding input receiving the measured value $\theta(z)$ of the phase angle to be corrected and a subtracting input connected to its own output via a first filter 71 having a transfer function F(z);

a second summing circuit 72 having a summing input connected to the output of the first summing circuit 70 and a subtracting input connected to its own output via a second filter 73 having a transfer function G(z); and a summing circuit 74 having two adding inputs, one connected to the output of the first filter 71 and the other connected to the output of the second filter 73, and delivering an output signal representative of the effective phase correction angle $\hat{\theta}(z)$.

The first summing circuit 70 and the first filter 71 represent the second order phase controlling feedback circuit having the initial position in the correction circuit. The second summing circuit 72 and the second filter 73 represent the first order phase controlling feedback circuit having the following position. The third summing circuit 74 represents the combination of the effects of the two phase controlling feedback loops.

Putting the signal at the output of the first filter 71 as $\hat{\theta}_1(z)$ and the output signal from the second filter 73 as $\hat{\theta}_2(z)$:

$$\hat{\theta}_1(z) = \frac{F(z)}{1 + F(z)} \theta(z) \tag{11}$$

$$\text{whence } \hat{\theta}_2(z) = \frac{G(z)}{1 + G(z)} [\theta(z) - \hat{\theta}_1(z)]$$

$$\hat{\theta}(z) = \hat{\theta}_1(z) + \hat{\theta}_2(z) = \frac{F(z) + G(z) + F(z)G(z)}{1 + F(z) + G(z) + F(z)G(z)} \theta(z)$$

Putting $P(z) = F(z) + G(z) + F(z)G(z)$ $$\hat{\theta}(z) = \frac{P(z)}{1 + P(z)} \theta(z)$$

which shows that the order in which the two phase controlling feedback loops are connected is immaterial and that the circuit in FIG. 5 is equivalent to a single phase-controlling feedback loop whose filter has the transfer function P(z).

Writing the transfer function M(z) on the basis of equation (9), (10) and (11), one obtains:

$$P(z) = \frac{z^{-1}}{1 - z^{-1}} \left[ \delta_1 + \gamma_1 + \frac{\gamma_2 + \delta_1 \gamma_1 z^{-1}}{1 - z^{-1}} + \frac{\delta_1 \gamma_2 z^{-1}}{(1 - z^{-1})^2} \right]$$

putting:
$a = \delta_1 + \gamma_1$
$b = \gamma_2$
$c = \delta_1 \gamma_1$ and
$d = \delta_1 \gamma_1$ and taking the equation (8) into account, $$P(z) = \frac{z^{-1}}{1-z^{-1}} M(z)$$

which shows that giving the digital filter 61 the transfer function M(z), one obtains a phase noise correction circuit having the same performance as that shown in FIG. 5, i.e. as a circuit having two phase controlling feedback control loops connected in cascades, one being a first order loop and the other being a second order loop, but with a much more simple structure.

The digital filter 61 shown in FIG. 3 is deduced by the following facturization of the transfer function:

$$M(z) = a + \frac{1}{1-z^{-1}}\left[b + cz^{-1} + \frac{dz^{-1}}{1-z^{-1}}\right] \quad (12)$$

This gives rise to a need for four amplifiers 112, 113, 114 and 115 for weighting the signals which pass therethrough by the respective weighting coefficients a, b, c and d. These amplifiers have their inputs connected to the input of the digital filter, the amplifiers 112 and 113 are directly connected thereto, while the other two amplifiers are connected via a delay circuit 116 which introduces a delay equal to the Baud interval $\Delta T$. The outputs of the amplifiers 113 and 114 are connected to the inputs of a summing circuit 117. The output of the amplifier 115 is connected to the input of an integration loop constituted by a summing circuit 118 having two inputs, one of which is connected to its own output via a delay circuit 119 that introduces a delay $\Delta T$. The output of the integration loop 118, 119 and the output of the summing circuit 117 are connected to the inputs of the summing circuit 120 whose output is connected to the input of an integration loop constituted by a summing circuit 121 having two inputs, one of which is connected to its own output via a delay circuit 122 which introduces a delay $\Delta T$. The output of the integration loop 121, 122 and the output of the amplifier 112 are interconnected via a summing circuit 123 whose output constitutes the output of the filter. In practice, this structure corresponds to the following algorithms:

$$u_k = u'_k + d\epsilon''_k$$

$$w_k = w'_k + b\epsilon''_k + u_k + c\epsilon''_k$$

where $u_k$ is the signal delivered by the integration loop 118, 119 and $w_k$ is the signal delivered by the integration loop 121, 122 while the integration loop 110, 111 of the phase angle generator 62 corresponds to the final algorithm:

$$\hat{\theta}_{k+1} = \hat{\theta}_k + w_k + a\epsilon''_k$$

Other structures exist for embodying the transfer function M(z). They can be derived from different facturizations of the formula (12) and they correspond to other algorithms. They are not described herein since they form part of the knowledge of a person skilled in the art.

Figure 4:
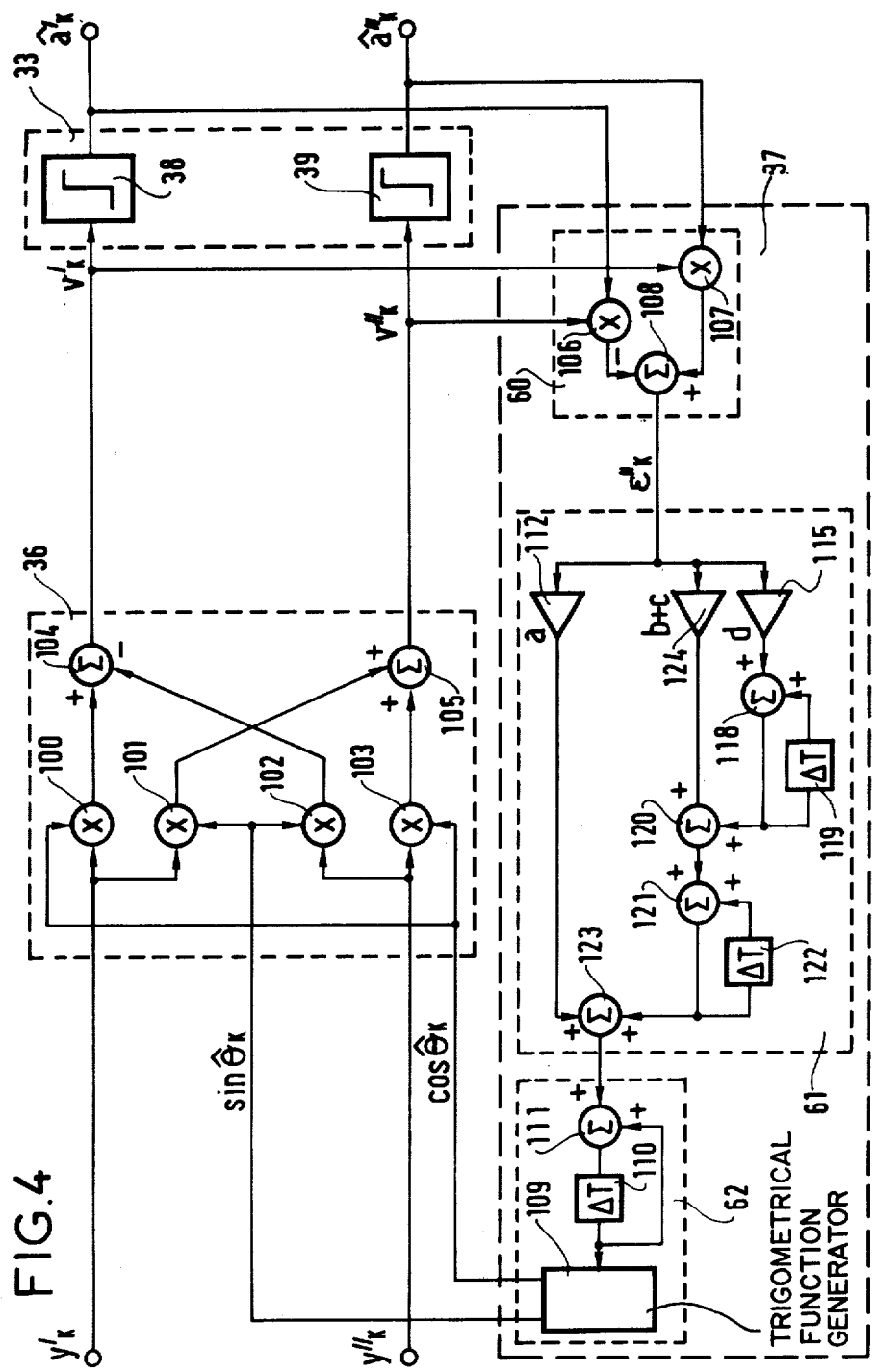
FIG. 4 shows a simplified version of the phase noise correction circuit of FIG. 3.

FIG. 4 shows a simplified version of the phase noise correction circuit of FIG. 3. The simplification is applied to the digital filter 61 and consists in removing the delay circuit 116, thereby making it possible to lump the amplifiers 113 and 114 as a single amplifier and consequently to omit the summing circuit 117. Removal of the delay circuit 116 is justified by the fact that this delay circuit is at the input end of a branch of the digital filter 61 which is terminated by an integration loop 121, 122, and which therefore has the function of generating a signal for compensating frequency drift. Since frequency drift is constant or at any rate varies very slowly, it makes little difference whether if the error term $\epsilon''_k$ is used in place of the error term $\epsilon''_{k-1}$ for compensating it. The digital filter 61 then has a transfer function which, in z transform notation has the form:

$$M'(z) = a + \frac{1}{1-z^{-1}}\left(b + c + \frac{d}{1-z^{-1}}\right)$$

The structure of the digital filter obtained after simplification and shown in FIG. 4 corresponds to new algorithms.

$$u'_k = u'_k + d\epsilon''_k$$

$$w'_k = w'_k + (b+c)\epsilon''_k + u'_k$$

where $u'_k$ is the new signal delivered by the integration loop 118, 119 and $w'_k$ is the new signal delivered by the integration loop 121, 122, and the final algorithm is clearly $$\hat{\theta}_{k+1} = \hat{\theta}_k + w'_k + a\epsilon''_k$$

As before there are other variants of the structure which can be derived to obtain same transfer function M'(z), these variants corresponding to different algorithms.

In some synchronous data transmission systems using symbols and modulating a carrier, the self-adaptive complex linear equalizer operates in the passband (i.e. a complex signal whose components are constituted by the undemodulated received signal and a quadrature version thereof). In this case the equalizer provides a complex output signal $y_k$ which is subject not only to a phase error $-\theta_k$ but also to a phase rotation of $2\pi f_c \Delta T$ with respect to the preceding complex signal $y_{k-1}$, which rotation is due to the fact that the signal is not demodulated. The phase noise correction circuit can then be used as a demodulator. For this purpose it is sufficient to modify the branch of the integration loop 110, 111 of the phase angle generator 62 so that it operates according to the algorithm:

$$\hat{\theta}_{k+1} = \hat{\theta}_k + 2\pi f_c \Delta T + m(\epsilon''_i)((\omega_-, k))$$

where $f_c$ is the frequency of the modulation carrier, and $\Delta T$ is the Baud period. This modification may consist in inserting a subtractor circuit 130 in between the incrementation input of the phase angle generator 62 and the output of the digital filter 61, said subtractor circuit 130 serving to subtract the quantity $2\pi f_c \Delta T$ from the signal delivered by the digital filter 61 before its application to the incrementation input of the phase shift angle generator 62. The subtractor circuit 130 is shown in the embodiments of FIGS. 6 and 7.

By giving the coefficients a,b,c and d respective values of about 0.92, 0.0004, 0.0176, and 0.00036, it has been possible to eliminate a frequency drift of up to 12 Hz and a phase jitter having an amplitude of 20° and a maximum frequency of 100 Hz from a synchronous data transmission system operating at 4,800 bits/s.

We claim:

1. A phase noise correction circuit for a synchronous data transmission system using symbols and including a decision circuit at its receiving end for supplying an estimate of the transmitted symbols on the basis of the received symbols, wherein said correction circuit comprises a phase shifter circuit located at the receiving end, an output of the phase shifter circuit being coupled to an input of the decision circuit, and a third-order phase-controlling feedback circuit connected in a feedback path between the decision circuit and the phase shifter circuit.

2. A phase noise correction circuit for a synchronous data transmission system using symbols and including a decision circuit (33) at its receiving end for supplying an estimate of the transmitted symbols on the basis of the received symbols, wherein said correction circuit comprises a phase shifter circuit (36) located at the receiving end, an output of the phase shifter circuit being coupled to an input of the decision circuit (33), and a third-order phase-controlling feedback circuit (37) connected in a feedback path between the decision circuit and the phase shifter circuit, the feedback circuit comprising:
- a phase shift angle generator (62) having an incrementation input and providing the phase shifter circuit (36) with the value of a phase shift angle, the phase shift angle generator updating the value of the phase shift angle at the rate at which the symbols are received,
- a phase error detector (60) providing the value of the phase error between the received and the estimated symbols appearing at terminals of the decision circuit (33) likewise at the rate at which the symbols are received; and
- a filter (61) interposed between the output of the phase error detector (60) and the incrementation input of the phase shift angle generator (62), the said filter (61) having a transfer function expressed as follows using the z transform:

$$M(z) = a + \frac{b + cz^{-1}}{1 - z^{-1}} + \frac{dz^{-1}}{(1 - z^{-1})^2}$$

where a, b, c and d are positive non-zero coefficients.

3. A phase noise correction circuit for a synchronous data transmission system using symbols and including a decision circuit (33) at its receiving end for supplying an estimate of the transmitted symbols on the basis of the received symbols, wherein said correction circuit comprises a phase shifter circuit (36) located at the receiving end, an output of the phase shifter circuit being coupled to an input of the decision circuit (33), and a third-order phase-controlling feedback circuit (37) connected in a feedback path between the decision circuit and the phase shifter circuit, the feedback circuit comprising:
- a phase shift angle generator (62) having an incrementation input and providing the phase shifter circuit (36) with the value of a phase shift angle, the phase shift angle generator updating the value of the phase shift angle at the rate at which the symbols are received;
- a phase error detector (60) providing the value of the phase error between the received and the estimated symbols appearing at terminals of the decision circuit (33), likewise at the rate at which the symbols are received; and
- a filter (61) interposed between the output of the phase error detector (60) and the incrementation input of the phase shift angle generator (62), the said filter (61) using the z transform:

$$M'(z) = a + \frac{b + c}{1 - z^{-1}} + \frac{d}{(1 - z^{-1})^2}$$

where a, b, c and d are positive non-zero coefficients.

4. A phase noise correction circuit according to claim 2, for a synchronous data transmission system using symbols and amplitude modulation of a carrier, further including a subtractor circuit inserted between the output of the filter and the incrementation input of the phase shift angle generator, for subtracting the value of the phase rotation performed by the carrier between two consecutive symbols from the value of the increment provided by the filter.

5. A phase noise correction circuit according to claim 3, for a synchronous data transmission system using symbols and amplitude modulation of a carrier, further including a subtractor circuit inserted between the output of the filter and the incrementation input of the phase shift angle generator, for subtracting the value of the phase rotation performed by the carrier between two consecutive symbols from the value of the increment provided by the filter.

* * * * *